United States Patent [19]

Morikawa et al.

[11] Patent Number: 4,516,422
[45] Date of Patent: May 14, 1985

[54] METHOD OF MANUFACTURING RACKS FOR VARIABLE RATIO STEERING GEARS

[75] Inventors: Kunihiko Morikawa, Yokosuka; Megumu Higuchi, Tokyo; Tokiyoshi Yanai, Yokosuka, all of Japan

[73] Assignee: Nissan Motor Co., Ltd., Yokohama, Japan

[21] Appl. No.: 504,402

[22] Filed: Jun. 15, 1983

[30] Foreign Application Priority Data

Jul. 7, 1982 [JP] Japan .................. 57-116997

[51] Int. Cl.³ ............................. B21D 31/00
[52] U.S. Cl. ........................ 72/377; 72/57; 72/412
[58] Field of Search ............ 72/377, 412, 57

[56] References Cited

U.S. PATENT DOCUMENTS 3,370,450  2/1968  Scheucher ............... 72/377
4,051,708 10/1977  Beane et al. ............. 72/377
4,193,722  3/1980  Bishop .................... 409/59

FOREIGN PATENT DOCUMENTS 55-48540  4/1980  Japan .
2026908   2/1980  United Kingdom .

Primary Examiner—W. D. Bray
Attorney, Agent, or Firm—Schwartz, Jeffery, Schwaab, Mack, Blumenthal & Koch

[57] ABSTRACT

In a method of manufacturing a rack for a variable ratio rack and pinion steering gear, having a preforming process for preparing a rack blank having a plurality of teeth which are formed to a shape corresponding approximately to the shape desired in the finished rack and a finishing process for converting the teeth to the finished shape by cold forming in a die having a shape which is the exact counterpart of the finished shape, the preformed rack teeth are shaped to have top lands which are level with those in the finished shape and bottom lands that are deeper than those of same. The rack teeth in the preformed shape are all wider at the top areas than in the finished shape, and the ratio of the widths at the root areas of the rack teeth in the preformed shape to those in the finished shape varies in proportion to the variation of the steering ratio such that a rack tooth for a higher steering ratio is given the above-mentioned ratio that is larger.

3 Claims, 11 Drawing Figures

METHOD OF MANUFACTURING RACKS FOR VARIABLE RATIO STEERING GEARS

BACKGROUND OF THE INVENTION

1. Field of the Invention

The present invention relates to a method of manufacturing racks for variable ratio rack and pinion steering gears.

2. Description of the Prior Art

A rack for such a variable ratio steering gear has teeth that may vary in pitch and shape to provide a variable steering ratio, as described in U.S. patent application Ser. No. 297,932 and No. 312,137, both assigned to the same assignee as this application. This kind of rack is manufactured by a method of including a preforming process for preparing a rack blank having teeth which are formed to a shape closely approximating the shape desired in the finished rack and a finishing process for converting the teeth to the finished shape by cold forming or coining in a die having a shape which is the exact counterpart of the finished shape, as described in U.K. patent application No. 2,026,908 and U.S. Pat. No. 4,193,722.

This prior art method is plagued by a problem that the quality of the product tends to vary widely, leading to difficulty in maintaining a desired level of quality. The method is faces another problem that the die for the finishing process tends to be damaged in a short period of use.

SUMMARY OF THE INVENTION

It is an object of the present invention to provide a novel and improved method of manufacturing a rack for a variable ratio rack and pinion steering gear which is free from the problems noted above.

It is another object of the present invention to provide a novel and improved method of manufacturing a rack of the above described character which makes it quite easy to maintain a desired level of quality in the finished product.

It is a further object of the present invention to provide a novel and improved method of manufacturing a rack of the above described character which enables a smaller press, viz., a press having a smaller tonnage or capacity as compared with that in the prior art method to be used successfully for the finishing process.

It is a yet further object of the present invention to provide a novel and improved method of manufacturing a rack of the above described character which is quite effective for prolongation of the life of the die for the finishing process.

In carrying out the above and other objects of this invention, the preformed shape of the rack teeth is improved so that the forces acting on the teeth of the rack blank during the finishing process are made approximately equal to each other. By this, the reaction forces applied to the teeth of the die are also equalized. That is, according to the present invention the rack teeth in the preformed shape are formed to have top lands which are even or level with those in the finished shape and bottom lands that are deeper than those of same. The rack teeth in the preformed shape are also formed to be all wider at the top areas than in the finished shape, with the ratio of the widths at the root areas of the rack teeth in the preformed shape to those in the finished shape being adapted to vary in proportion to the variation of the steering ratio such that a rack tooth for a higher steering ratio is given the above-mentioned ratio that is larger.

BRIEF DESCRIPTION OF THE DRAWINGS

The features and advantages of the method according to the present invention will become more clearly appreciated from the following description taken in conjunction with the accompanying drawings, in which.

DESCRIPTION OF THE PREFERRED EMBODIMENT

Figure 1:
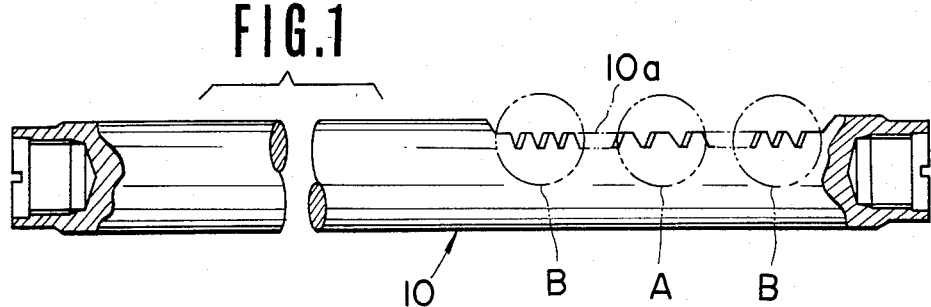
FIG. 1 is a partly sectional side elevation of a rack for use in a variable ratio rack and pinion steering gear, to which the present invention is applicable with advantage.

In FIG. 1, a rack for manual steering is shown by way of example and generally designated by 10. The rack 10 has teeth 10a for meshing with a pinion (not shown in the drawing.) The rack teeth 10a are adapted at the central portion A for lower steering ratios and at each side portion B for higher steering ratios. The steering ratio increases smoothly all the way from the central portion A to each side portion B.

Figure 2:
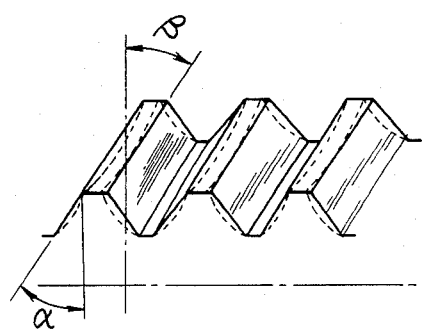
FIG. 2 is a perspective view of some of the teeth of a prior art rack which are adapted for lower steering ratios and correspond to the teeth included in the portion A of the rack of FIG. 1, in which the teeth illustrated by full lines represent the preformed shape and by broken lines the final shape.
Figure 3:
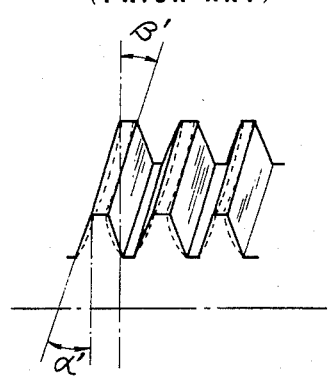
FIG. 3 is a perspective view of some other teeth of the prior art rack of FIG. 2 which are adapted for higher steering ratios and correspond to the teeth included in the portion B of the rack of FIG. 1, in which the teeth illustrated by full lines represent the preformed shape and by broken lines the final shape.

FIG. 2 shows some of the teeth of a prior art rack adapted for lower steering ratios, i.e., corresponding to the teeth included in the central portion A of the rack of FIG. 1. The rack teeth of FIG. 2 have large pressure angles $\alpha$, large pitches (not designated) and large inclination angles $\beta$. FIG. 3 shows some other teeth of the same rack as of FIG. 2 which are adapted for higher steering ratios, i.e., corresponding to the teeth included in each side portion B of the rack of FIG. 1. The rack teeth of FIG. 3 have small pressure angles $\alpha'$, small pitches (not designated) and small inclination angles $\beta'$.

As described hereinbefore, this kind of rack is manufactured by a method of including a preforming process for preparing a rack blank having teeth which are formed to a shape closely approximately the final shape desired in the finished rack and a finishing process for converting the teeth to the finished or final shape by cold forming or coining in a die having a shape which is the exact counterpart of the finished shape. In FIGS. 2 and 3, the preformed shape is illustrated by full lines and the final shape by broken lines.

Figure 4:
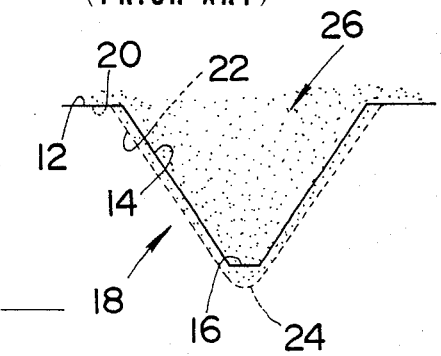
FIG. 4 is an enlarged fragmentary sectional view of the rack teeth of FIG. 2, in which the full lines represent the preformed shape and the broken lines represent the final shape.
Figure 5:
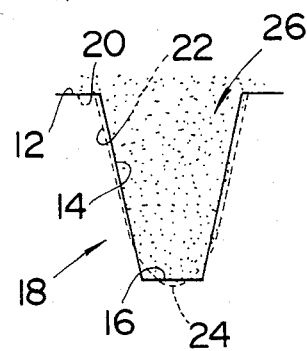
FIG. 5 is an enlarged fragmentary sectional view of the rack teeth of FIG. 3, in which the full lines represent the preformed shape and the broken lines represent the final shape.
Figure 6A:
FIG. 6A is a top plan view of a prior art rack.
Figure 6B:
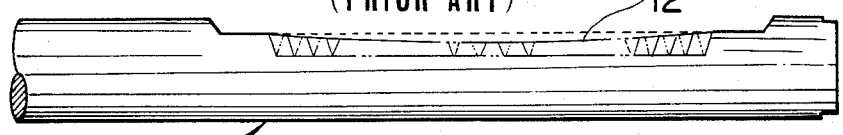
FIG. 6B is a side elevation of the rack of FIG. 6A.

Heretofore, the preformed shape has been determined in a manner to simply approximate the final shape without reference to the variation of the steering ratio, that is, as shown in FIGS. 4 and 5 a prior art preformed shape is determined so that the top land 12, tooth faces 14 and bottom lands 16 of each tooth of a rack 18 are brought into contact with the bottom land 20, tooth faces 22 and top lands 24 of the corresponding teeth of a press die 26 approximately at the same time when the press die 26 is closed near its shut height during the finishing process. Accordingly, the top land 12, tooth faces 14 and bottom lands 16 of each rack tooth are subjected to pressing forces approximately at the same time when finished by the pressing operation. When processed by the above method, the finished rack 18 tends to buldge out sideways at a part around the central portion of the rack teeth, with the top lands 12 being concave at a part around the central portion of the rack teeth, as shown in FIGS. 6A and 6B though the figures illustrate the tendency in an exaggerated manner. In this connection, it is found by the study conducted by the applicants that the pressing to which the rack teeth are subjected during the finishing process is not uniform and results in the tendency that the die imparts its shape more precisely to the teeth having a small pressure angle, small pitch and small inclination angle than to the teeth having a large pressure angle, large pitch and large inclination angle. It is this irregular pressing that causes the problems noted hereinbefore, which is revealed by the study conducted by the applicants.

The preformed shape proposed by the foregoing U.K. patent application is determined without reference to the variation of the steering ratio and therefore may be accomplished by the above-mentioned irregular pressing which will cause not only a wide variation in the quality of products but also a shortened life of the press die. Furthermore, the preformed shape is determined so that the top lands are not even with those of the final shape but higher than same. It is therefore necessary for the top lands of the preformed rack teeth to be pushed down to a lower level during the pressing. In carrying out this method, it is inevitably necessary to use a large-sized press, that is, a press having a great tonnage or capacity.

In order to overcome those problems, a novel and improved method is proposed according to the present invention in which the rack teeth in the preformed shape have top lands that are even or level with those of the teeth in the finished shape and bottom lands that are deeper than those of same, in which the rack teeth in the preformed shape are all wider at the top areas than in the finished shape, in which some of the rack teeth for lower steering ratios and in the preformed shape are narrower in the root areas than in the finished shape while some of the rack teeth for higher steering ratios and in the preformed shape are wider at the root areas than in the finished shape, and in which the ratio of the widths at the root areas of the rack teeth in the preformed shape to those in the finished shape varies in proportion to the variation of the steering ratio such that a rack tooth for a higher steering ratio is given the above-mentioned ratio that is larger.

Figure 7:
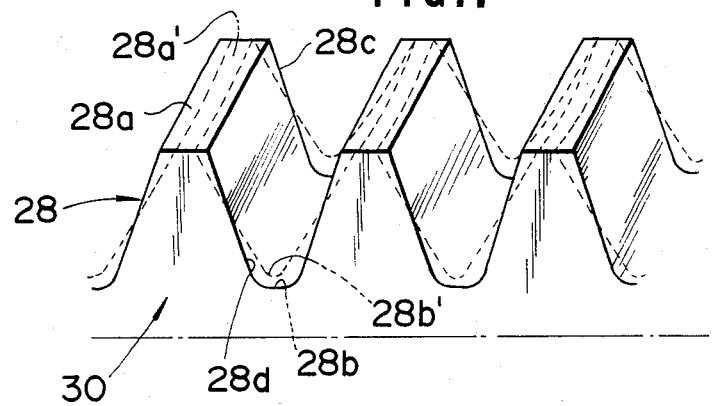
FIG. 7 is a perspective view of some of the teeth of a rack formed in accordance with the method of the present invention, which rack teeth are adapted for lower steering ratios and correspond to the teeth included in the portion A of the rack of FIG. 1, in which the teeth illustrated by full lines represent the preformed shape and by broken lines the final shape.
Figure 10:
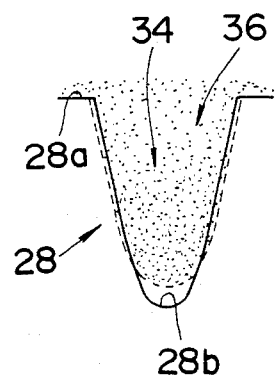
FIG. 10 is an enlarged fragmentary sectional view of the rack teeth of FIG. 8, in which the full lines represent the preformed shape and the broken lines represent the final shape.

Referring to FIGS. 7 and 10, in particular, the present invention will be described more in detail.

Figure 9:
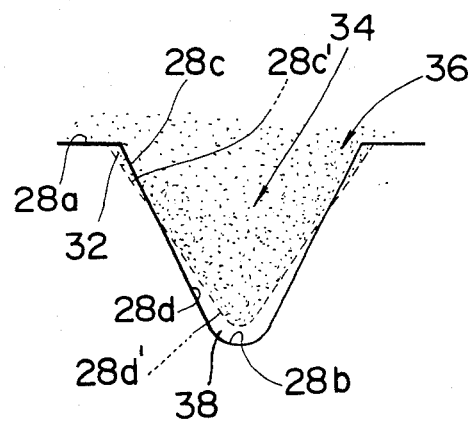
FIG. 9 is an enlarged fragmentary sectional view of the rack teeth of FIG. 7, in which the full lines represent the preformed shape while the broken lines represent the final shape.

FIGS. 7 and 9 show some of the teeth 28 of a rack or rack blank 30 formed in accordance with the present invention, in which the teeth illustrated by full lines represent the preformed shape and by broken lines the final shape. The rack teeth 28 of FIG. 7 are adapted for lower steering ratios and have large pressure angles $\alpha$, large pitches (not designate) and large inclination angles $\beta$. As better shown in FIG. 9, the rack teeth 28 for lower steering ratios and in the preformed shape have top lands 28a that are even or level with those 28a' in the final shape and bottom lands 28b that are deeper than those 28b' in the final shape. The rack teeth 28 for lower steering ratios and in the preformed shape are also formed to be wider at the top areas 28c while narrower at the root areas 28d than in the final shape.

Figure 8:
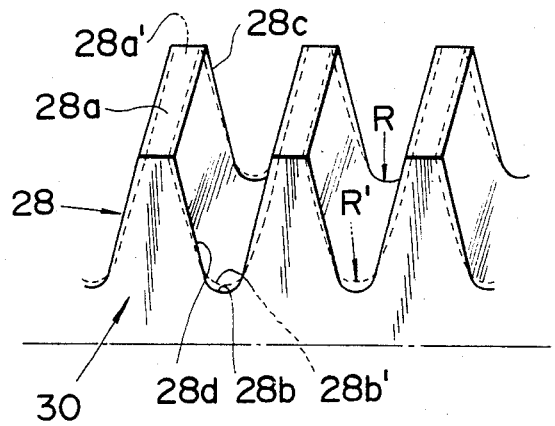
FIG. 8 is a perspective view of some other teeth of the rack of FIG. 7 which are adapted for higher steering ratios and correspond to the teeth included in the portion B of the rack of FIG. 1, in which the teeth illustrated by full lines represent the preformed shape and by broken lines the final shape.

FIGS. 8 and 10 show some other teeth of the same rack 30 as of FIGS. 7 and 9 which are formed in accordance with the present invention, in which the preformed shape is illustrated by full lines and the final shape by broken lines. The rack teeth of FIG. 8 are adapted for higher steering ratios and have small pressure angles $\alpha'$, small pitches (not designated) and small inclination angles $\beta'$. As better shown in FIG. 10, the rack teeth 28 for higher steering ratios and in the preformed shape have top lands 28a that are even or level with those 28a' in the final shape and bottom lands 28b that are deeper than those 28b' in the final shape, similarly to the rack teeth for lower steering ratios and in the preformed shape. The rack teeth 28 for higher steering ratios and in the preformed shape are also formed to be wider both at the top areas 28c and at the root areas 28d than in the final shape. As shown in FIGS. 8, the bottom lands 28b of some of the rack teeth 28 for higher steering ratios and in the preformed shape may preferably be rounded to be of radii R that are approximately equal to those R' of the corresponding bottom lands 28b' in the final shape. This is quite effective for preventing sharp corners from being formed at the root areas in the finished rack teeth.

While the rack teeth 28 in the preformed shape are all wider at the top areas 28c than in the finished shape, some of the rack teeth 28 for lower steering ratios and in the preformed shape are narrower at the root areas 28d than in the final shape as seen from FIGS. 7 and 9 while some of the rack teeth 28 for higher steering ratios and in the preformed shape are wider at the root areas 28d than in the final shape as seen from FIGS. 8 and 10. The ratio of the widths at the root areas 28d of the rack teeth 28 in the preformed shape to those in the finished shape varies in proportion to the variation of the steering ratio. That is, the ratio varies in a manner to give a rack tooth for a higher steering ratio the above-mentioned ratio that is larger so that the forces acting on the respective teeth 28 of the rack blank 30 during the finishing process are made approximately equal to each other.

The foregoing preforming of the rack blank can be attained by various known processes such as machining as described in the foregoing U.S. patent or hot forging or warm forging.

The rack preformed in the foregoing manner of this invention can be finished to the desired shape quite accurately by a pressing operation using, similarly to the prior art method, a die having a shape that is the exact counterpart of the finished shape of the rack teeth. That is, during the pressing operation, as can be seen from FIG. 9, the surplus metal 32 at the top area 28c of each rack tooth 28 is pressed gradually by a corresponding tooth 34 of a die 36 and is displaced to cause a corresponding amount of metal to flow into the area 38 around the bottom land 28b of the rack tooth 28. By causing such a metal flow, the press die 36 can impart its shape more precisely as compared with the prior art method described with reference to FIG. 4. Since the force necessary for causing such a metal flow is not so large, a smaller press, that is, a press having a small tonnage or capacity as compared with that in the prior art method can be successfully employed for performing the pressing operation.

As can also be seen from FIG. 10, a rack tooth 28 for a higher steering ratio is finished substantially similarly to the prior art method described with reference to FIG. 5 except that a die tooth 34 is smaller in height than the rack tooth 28 in the preformed shape and has a top rounded correspondingly to the rounded bottom in the final shape. Thus, the press die 36 not only imparts its shape precisely to the teeth 28 for higher steering ratios but also is not subjected at its tooth tops to large forces during the finishing process.

From the foregoing, it is to be understood that according to the present invention the rack teeth can be finished uniformly by pressing, that is, it is made possible for the press die to impart its shape precisely not only to the teeth for higher steering ratios but also to the teeth for lower steering ratios.

It is further to be understood that the above uniform pressing can be attained with a smaller press as compared with that utilized in the prior art method.

It is still further to be understood that the method of this invention is quite effective in preventing the press die from being damaged at the tooth tops particularly of the teeth for finishing the rack teeth for higher steering ratios.

Obviously, numerous modifications and variations of the present invention are possible in light of the above teachings. It is therefore to be understood that within the scope of the appended claims, the invention may be practiced otherwise than as specifically described herein.

What is claimed is:

1. A method of manufacturing a rack for a variable ratio rack and pinion steering gear, comprising:
   a preforming process for preparing a rack blank having a plurality of teeth which are formed to a shape corresponding approximately to the shape desired in the finished rack said preforming process including forming top lands of said preformed rack teeth to be level with those in the finished shape, forming bottom lands of said preformed rack teeth to be deeper than those in the finished shape, forming the widths of the preformed teeth such that the preformed teeth are all wider at the top areas than in the finished shape, and forming the ratio of the widths at the root areas of the rack teeth in the preformed shape to those in the finished shape in proportion to the variation of the steering ratio such that a rack tooth for a higher steering ratio has a higher width ratio; and
   a finishing process comprising converting the teeth to a finished shape by cold forming the rack blank in a die having a shape corresponding to a counterpart of the finished shape.

2. A method of manufacturing a rack as set forth in claim 1, comprising forming some of the rack teeth for lower steering ratios in the preformed shape narrower at the root areas than in the finished shape and forming some of the rack teeth for higher steering ratios in the preformed shape wider at the root areas than in the finished shape.

3. A method of manufacturing a rack as set forth in claim 1, comprising forming the bottom lands of some of the rack teeth for higher steering ratios in the preformed shape rounded at radii that are approximately equal to those of the corresponding bottom lands in the finished shape.

* * * * *